(12) United States Patent
Logan et al.

(10) Patent No.: US 8,101,277 B2
(45) Date of Patent: Jan. 24, 2012

(54) THERMALLY FORMED, DIMENSIONALLY AND TOPOGRAPHICALLY EXACT, AUTOMOTIVE PROTECTIVE FILM

(76) Inventors: Gerald Alvin Logan, Hillsboro, OR (US); Sean Scott Logan, Hillsboro, OR (US)

( * ) Notice: Subject to any disclaimer, the term of this patent is extended or adjusted under 35 U.S.C. 154(b) by 578 days.

(21) Appl. No.: 12/221,356

(22) Filed: Aug. 1, 2008

(65) Prior Publication Data

US 2010/0028666 A1    Feb. 4, 2010

(51) Int. Cl.
*B32B 27/08* (2006.01)
*B32B 17/10* (2006.01)
(52) U.S. Cl. .............. 428/423.7; 428/424.7; 428/339
(58) Field of Classification Search .......... 428/339, 428/423.1, 423.7, 424.7
See application file for complete search history.

(56) References Cited

U.S. PATENT DOCUMENTS

| 5,861,211 | A | * | 1/1999 | Thakkar et al. ............. 428/343 |
| 6,998,084 | B2 | | 2/2006 | Horansky |
| 7,323,239 | B2 | | 1/2008 | Vanderstappen |
| 7,713,604 | B2 | * | 5/2010 | Yang et al. ............. 428/40.1 |
| 2005/0227031 | A1 | * | 10/2005 | Yang et al. ............. 428/40.1 |

* cited by examiner

*Primary Examiner* — Thao T. Tran
(74) *Attorney, Agent, or Firm* — Mark S. Hubert

(57) ABSTRACT

A multi-protective layered film is thermally formed to the exact dimensions and topography of an automobile's headlights and fog lights, protecting the headlights/fog lights from gravel hits and weathering. The multilayered film comprises an aliphatic urethane layer, an adhesive layer, and a polyethylene liner. All three layers are vacuum molded to the exact dimensions and topography of a headlight/fog light. A method for the thermal forming of the film is also disclosed.

4 Claims, 3 Drawing Sheets

THERMALLY FORMED, DIMENSIONALLY AND TOPOGRAPHICALLY EXACT, AUTOMOTIVE PROTECTIVE FILM

BACKGROUND OF THE INVENTION

Headlights and fog lights of modern automobiles are in every conceivable shape, and often the shape varies for every model and year. As technological innovation and new technologies have grown, new designs and new headlight shapes have been created. The auto designer is now given exceptional freedom to get the exact look and style he or she wants. Unfortunately, for the consumer, should replacement of a headlight become necessary due to gravel hits, UV damage or weathering, replacements costs are often in the hundreds (if not thousands) of dollars.

Further, with the custom paint jobs found on many of today's luxury automobiles, consumers are installing body panel paint protection films to protect against rock chips.

Paint protection films have been commercially available for years. The instillation of these films can be difficult. To avoid over-stretching, dimples, blistering, visible seams, and finger prints many vehicle owners turn to professional installers, and are stuck with the high cost of the installation.

Accordingly, it is desirable to provide a headlight/fog light protection film that is thermally molded to the exact dimensions and topography of the owner's headlight/fog light. Installation can be easily accomplished by the customer, with the film effortlessly sliding into place like the last piece of a jigsaw puzzle.

SUMMARY OF THE INVENTION

The general purpose of the present invention, which will be described subsequently in greater detail, is to provide a thermally molded, dimensionally and topographically exact protective film with liner for vehicle headlights and fog lights, which includes a HD or LD polyethylene liner, an acrylic adhesive, and an aliphatic thermoplastic urethane layer.

It is a further object of this invention to provide a method for making a thermally formed, dimensionally and topographically exact, protective film with liner for vehicle headlights and fog lights through the steps of: spraying a commercially available aliphatic urethane thermoplastic film with a pressure sensitive acrylic adhesive which has been reduced with a solvent and flash dried; introducing the urethane film, adhesive side down, to the polyethylene liner for passage through a calendaring machine, which laminates the film to the liner; vacuum molding the resultant laminate at approximately 300°-400° F. (depending on size of the laminate)in a cast aluminum mold (formed from a laser scan of a headlight); thereby obtaining a dimensionally and topographically exact protective film with liner for vehicle headlights and fog lights, which is not anticipated, rendered obvious, suggested, or even implied by any of the prior art, either alone or in any combination thereof.

In accordance with the invention, an object of the present invention is to provide a headlight and fog light protection film that is dimensionally and topographically exact to the headlight and fog light of the vehicle such that when installed, will not buckle, fold-over, crease or stretch so as to induce geometrical and topographical distortions.

It is another object of this invention to greatly increase the ease of installation of the protection film since the protection film is molded to the exact dimensions and topography of the headlight; the film effortlessly slides into place with no trimming of the film.

It is a further object of this invention to increase the life of the headlight/fog light by protecting against rock chips, while maintaining the optical clarity and light transmission of the light.

It is still a further object of this invention to increase the life of the headlight/fog light by protecting against weathering of the headlight that is the result of ultraviolet damage.

Additionally, to those skilled in the art, it should be readily apparent that the application of the herein disclosed invention is not limited to only vehicle headlights and fog lights, but could extend to entire panels of a vehicle or the entire front end of a vehicle which is often plagued by weathering, and rock chips, abrasions, etc.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
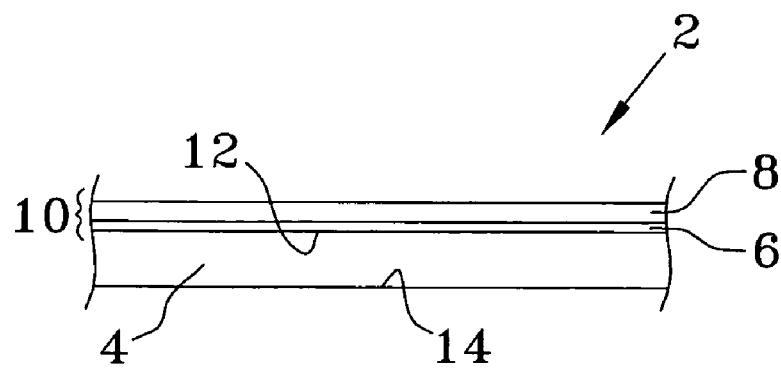
FIG. 1 is an enlarged cross-sectional view, illustrating the layers, of the preferred embodiment.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Referring to FIG. 1, in the preferred embodiment of the present invention, a dimensionally and topographically exact protective film with liner 2, for vehicles headlights and fog lights includes a low density or high density polyethylene liner 4 (depending upon the size, contouring, and application of the finished product), an acrylic adhesive 6, and an aliphatic thermoplastic urethane layer 8. The polyethylene liner 4 preferably has a thickness in the range between 0.005 and 0.030 inches, and has a first textured surface 12 and a generally parallel second textured surface 14. The acrylic adhesive 6 is mixed with a highly aromatic thinning agent and sprayed on one side of the aliphatic thermoplastic urethane layer 8. The aliphatic thermoplastic urethane layer 8 preferably has a thickness in the range between 0.005 and 0.030 inches. It should be appreciated by those skilled in the art that the specific type of adhesive, thinning agent, and spray technique (airless, HVLP, etc) may vary. The thickness of this layer of acrylic adhesive 6 after the thinning agent vaporizes is between 0.001 and 0.010 inches thick (preferably 0.0025 inches thick.) The polyethylene liner 4 resides adjacent to and in contact with the adhesive layer 6.

Figure 2:
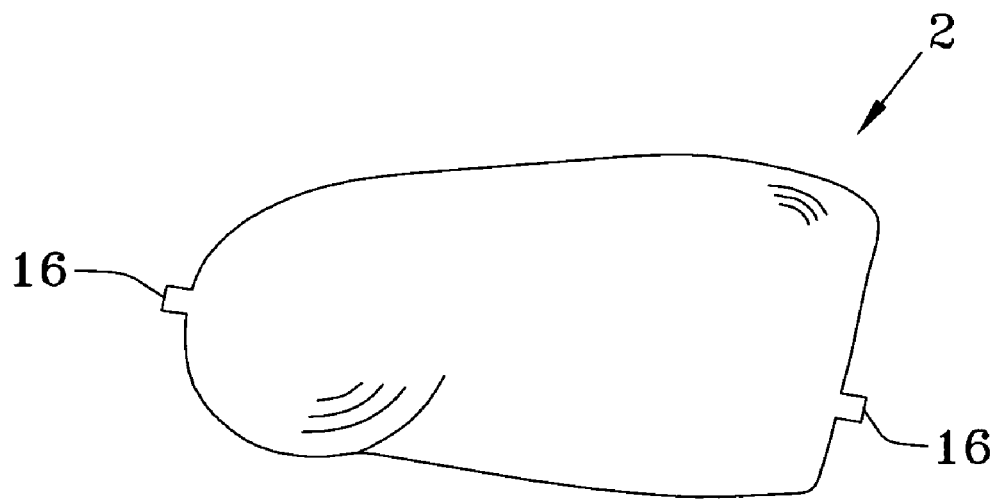
FIG. 2 is a top view of the preferred embodiment.
Figure 3:
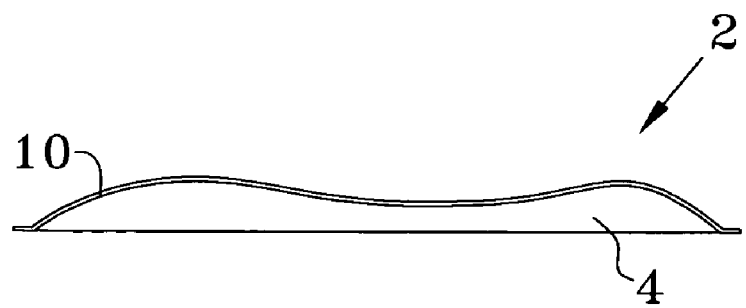
FIG. 3 is an enlarged front view of the preferred embodiment.
Figure 4:
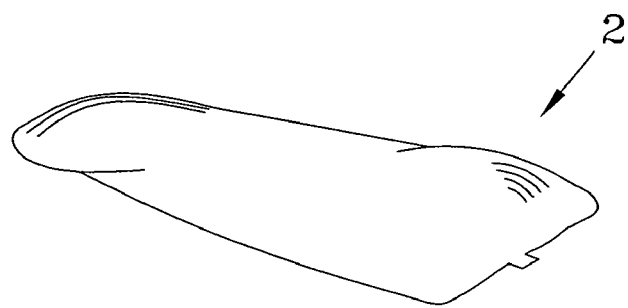
FIG. 4 is an isometric view of the preferred embodiment.
Figure 5:
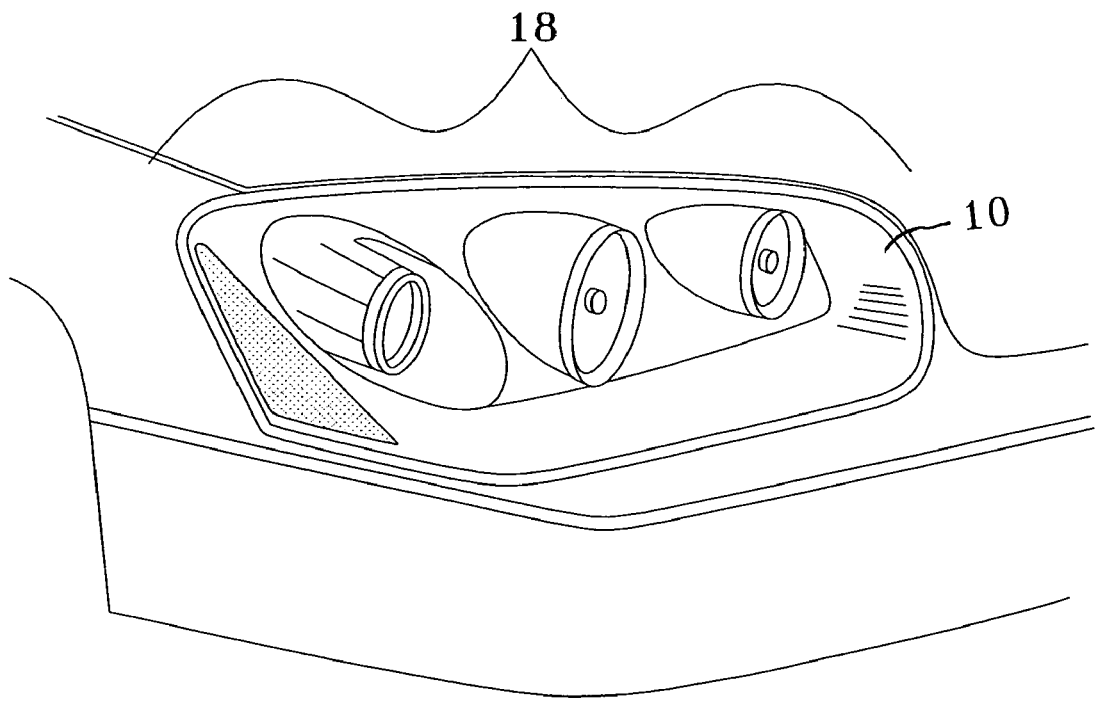
FIG. 5 illustrates the thermally formed, dimensionally and topographically exact film on a vehicle's headlight.
Figure 6:
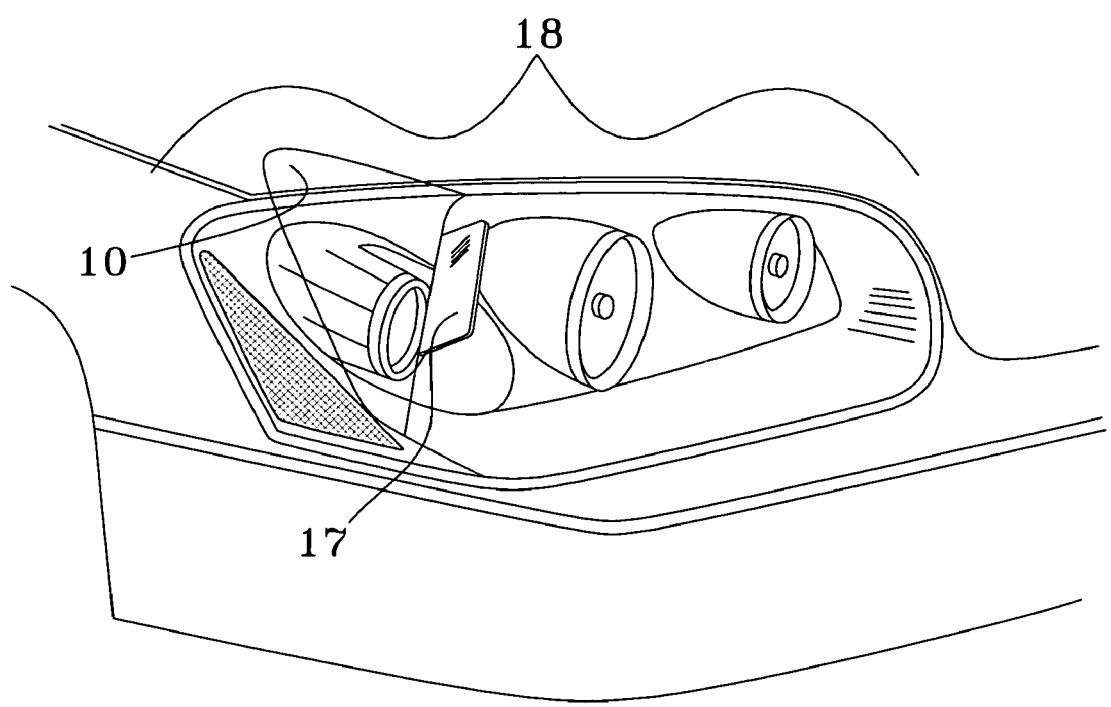
FIG. 6 illustrates the application of the thermally formed, dimensionally and topographically exact film on a vehicle's headlight.

FIG. 2 illustrates the preferred embodiment 2 thermally molded to the exact dimensions and topography of an headlight. Cut-away application tabs 16 are included to facilitate the process of removing the formed film 10 from its polyethylene liner 4. The formed film 10 is the aliphatic thermoplastic urethane layer 8 removed from the polyethylene liner 4 after thermal forming. These tabs 16 are extensions of the urethane layer 8 and the polyethylene liner 4 where the polyethylene liner 4 and urethane layer 8 has score marks (not pictured) for their removal. In addition to the cut-away application tabs 16, the textured second surface 14 of the polyethylene liner 4 on the tabs 16 aids in the removal of the formed film 10 from the polyethylene liner 4, by providing a textured surface for the installer's grip. The contouring acquired during the thermal molding of polyethylene liner 4, the acrylic adhesive 6 and the aliphatic thermoplastic urethane layer 8 is visible in FIG. 3. FIG. 4 is a isometric view of the preferred embodiment 2. Additionally, FIG. 5 illustrates the formed film 10 applied to a vehicle headlight 18, while FIG. 6 illustrates the application of the formed film 10 to a vehicle's headlight 18 with a squeegee 17.

The method for making the thermally formed, dimensionally and topographically exact protection film with liner 2 includes the steps of:

(1) spraying the aliphatic thermoplastic urethane film 8 with an acrylic pressure sensitive adhesive 6 (the adhesive has been reduced with a volatile solvent to allow thinning sufficient to enable a 0.0025 inch thick layer of adhesive 6 to be applied);
(2) flash drying the acrylic pressure sensitive adhesive 6 applied onto the aliphatic thermoplastic urethane film 8;
(3) affixing the first textured surface 12 of the high density or low density polyethylene liner 4 onto the pressure sensitive adhesive 6 by pressure rolling through a calendering machine;
(4) cutting the resultant, generally planer laminate of the urethane film 8 and polyethylene liner 4 into workable sized pieces sized for the specific application;
(5) putting the generally planar laminate onto a clamp frame and oven heating the generally planar laminate to a temperature between 300° and 400° F.;
(6) removing the heated generally planar laminate from the oven and vacuum molding the generally planar laminate about a cast aluminum mold (formed from a laser scan of a vehicle part, such as a headlight;
(7) removing the now contoured laminate from the vacuum mold and the clamp frame, when the contoured laminate has cooled to approximately 100° to 150° F.
(8) trimming any excess laminate to obtain a thermally formed, dimensionally and topographically exact protective film with liner 2.

In step (1) the aliphatic thermoplastic urethane layer 8 has performed suitably; however it should be appreciated that any number of thermoplastics, including vinyl with a ultraviolet light resistant coating could be used without departing from the scope of the invention. The aliphatic thermoplastic urethane film 8 is both optically clear (as per Department of Transportation standards) and filters the destructive UV rays (which haze and cloud some polymer and glass headlights with the passage of time.)

In step (3) the high density or low density polyethylene liner 4 has also performed suitably. However, it should be appreciated that any number of thermoplastics could be used without departing from the scope of the invention.

In step (6) the laser scan of the headlight/fog light is increased by 0.008 inches per inch +/−0.005 inches in both the x and y dimensions of the Cartesian coordinate system to account for shrinkage of the contoured laminate during the cooling process. This increase to account for the shrinkage of the contoured laminate, is of course translated to the cast aluminum mold. It has been determined that the preferred aliphatic thermoplastic urethane film 8 thickness is (0.005–0.030 inches, depending on application), and the preferred acrylic pressure sensitive adhesive 6 thickness is 0.001 and 0.010 inches thick, and the preferred thickness of the high density or low density polyethylene liner 4 is (0.005–0.030 inches, depending on application), shrinkage of all the components of the dimensionally and topographically exact protective film with liner 2 is uniform such that no distortions are introduced.

The choice of using high density or low density polyethylene liners 4 rests with the size of the vehicle component for which the protective film with liner 2 is being fabricated to protect. Larger components such as bumpers lend themselves better to high density polyethylene use (to retain the shape with little distortion when storing, shipping, and applying) while smaller components such as headlights and mirrors lend themselves better to low density polyethylene use.

The heat formation of the dimensionally and topographically exact protective film with liner 2 in the specific manner and with the specific elements discussed above renders an optically clear, formed film 10 that retains the three dimensional topography of the mold it was heat formed about, minus the 0.008 inches per inch of X and Y dimensional shrinkage. A UV retardant layer or coating may be optionally applied to the aliphatic thermoplastic urethane film 8 as is well know in the industry; however, this is often offered directly from the urethane manufacturer. The level of heat used in this process has been selected so as to anneal the aliphatic thermoplastic urethane film 8 and remove the residual stresses therein, such that when topographically formed, will result in a formed film 10 that holds its contoured shape. Thus, when installed, the formed film 10 being structurally relaxed, will not "fight" to return to a planar film. Thus formed film 10 will avoid over-stretching, dimpling, wrinkling, overlapping, blistering, visible seams, peeling, sliding, lifting and cupping, resulting in a truly "invisible" product when applied. This is a feature heretofore not seen in the industry.

Installation of the formed film 10 onto a vehicle's exterior surface is accomplished in the following manner (See FIG. 6):

1. Remove the formed film 10 from the polyethylene liner 4.
2. Wet application of the formed film 10 is required;
3. In order to freely move the formed film 10 about the vehicle's headlight 18 a solution of soap and water must be applied to the vehicle headlight 18, the adhesive side of the formed film 10, and the installer's fingers. This soap and water solution is easily formed with two drops of a commercially available liquid soap combined with 8 ounces of water.
4. In order to secure the formed film 10 to the vehicle's headlight 18 a solution of isopropyl alcohol and water is used. Lift ½ of the formed film 10 off of the headlight's 18 surface and spray both the adhesive side and non-adhesive side of the formed film 10 with the alcohol and water solution. Using this solution helps wash the soap and water solution away and allows the squeegee 17 to easily slide over the formed film 10 to remove any remaining soap and water solution and bubbles. Now, the remaining ½ of the formed film 10, can be removed from the headlight's 18 surface and sprayed in the manner above with the alcohol and water solution. The alcohol and water solution is easily formed with 4 ounces of commercially available isopropyl alcohol combined with 12 ounces of distilled water.

5. Spray the entire formed film 10 (now in place on the vehicle's headlight 18) again with the alcohol and water solution.

6. Squeegee the formed film 10 such that any remaining soap and water solution and/or air bubbles are removed.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A stress relieved, topographically matched, protective product for automotive exterior surfaces comprising:
    a stress relieved film, vacuum formed to topographically match said automotive exterior surface, and made of an aliphatic thermoplastic urethane film with an acrylic pressure sensitive adhesive applied thereto;
    an inner first textured surface of a polyethylene liner that is matingly conformed and affixed to said pressure sensitive adhesive, and an outer second textured surface of said polyethylene liner;
    scored, cut-away application tabs;
    and wherein said second textured surface aids in the removal of said urethane film from said liner.

2. The stress relieved, topographically matched, protective product of claim 1 wherein said urethane layer is 0.005 to 0.030 inch thick.

3. The stress relieved, topographically matched, protective product of claim 2 wherein said adhesive layer is 0.0025 inch thick.

4. The stress relieved, topographically matched, protective product of claim 3 wherein said textured polyethylene layer is 0.005 to 0.030 inch thick.

* * * * *